United States Patent [19]

Schley

[11] Patent Number: 4,976,045
[45] Date of Patent: Dec. 11, 1990

[54] SINE BAR FOR COMPOUND ANGLES

[76] Inventor: Richard A. Schley, 627 Trumbull Ave., Warren, Ohio 44484

[21] Appl. No.: 461,812

[22] Filed: Jan. 8, 1990

[51] Int. Cl.$^5$ .............................................. G01B 3/50
[52] U.S. Cl. ..................................................... 33/537
[58] Field of Search .............. 33/536, 537, 573, 1 AA, 33/534, 535

[56] References Cited

U.S. PATENT DOCUMENTS

| | | | |
|---|---|---|---|
| 2,111,299 | 3/1938 | Robbins | 33/536 X |
| 2,306,227 | 12/1942 | Seidel | 33/537 |
| 3,243,885 | 4/1966 | Johnson | 33/536 |

Primary Examiner—Harry N. Haroian
Attorney, Agent, or Firm—Low and Low

[57] ABSTRACT

A simple, unique sine bar for facilitating measurement of compound angles characterized by the precise positioning of three spheres with respect to an upper plate upon which a workpiece is placed for inspection and measurement as to accuracy with respect to a compound angle cut thereon. A right angle corner of the sine bar defines an axis coincident with the center of the sphere thereat, whereby a trigonometric solution of the vertical distances defining the angle cut of the workpiece may be readily determined.

9 Claims, 3 Drawing Sheets

SINE BAR FOR COMPOUND ANGLES

BACKGROUND OF THE INVENTION

Sine bars or sine plates are commonly employed in machine shops and the like for the inspection of single and compound angles on workpieces. While sine bar devices are well known for the measurement of simple angles, the checking and determination of compound angles of a workpiece presents a far more difficult situation.

Thus, typical prior art techniques for compound angle measurements may take one of three approaches in setting up the workpiece to be inspected:

Firstly, the inspector can use two separate sine bars, the two used in conjunction so as to bring the compound surface level. In practical terms, this is the common approach in most work environments.

A second approach employs a hinged type of compound sine plate wherein two plates are hinged to each other and permit the orientation of the compound surface to level position. This system is taught, for example, in U.S. Pat. No. 3,243,885 to D. W. Johnson.

The third approach employs three spheres to render an angled surface level. This is also taught in the aforesaid Johnson patent, as well as in U.S. Pat. No. 2,306,227 to G. Seidel.

There is need for a more reliable and simpler approach to sine bar measurement of compound angles, and further, for a sine bar that has the requisite geometry to make it trigonometrically possible to ascertain the vertical distance from a base surface to the compound surface under measurement.

SUMMARY OF THE INVENTION

This invention relates to sine bars, and more particularly to sine bars used to measure compound angles having the required geometry as above noted Whenever discussing compound sine plates utilizing sphere means for effecting the desired inspection, one must always realize that the angle that is to be set up is always within a plane that is perpendicular to the base horizontal surface. Furthermore, the particular angles used for set-up will likely be angles other than those contained within the piece to be inspected.

As noted above, there are presently known means to bring a compound surface on a part to be inspected to a level position and then proceed to check the levelness of the compound surface, as noted in the Johnson patent, for example. There is, however, no present means to set up a compound surface on a sine plate of the three-spheres type, and then proceed to check the subject workpiece surface to requirements of lengths and angles therefor all within a given tolerance, in accordance with original blueprints.

The present invention embraces methods and means to solve for a predetermined distance with which to compare or measure the compound surface under check. Such a predetermined distance will be and is the mathematically exact distance between the compound surface and the horizontal plane. This distance can be compared, by the use of an indicator, to conventional gauge blocks of high precision.

Further, in accordance with the invention, methods and means are provided to solve for angles of elevation that will correctly bring the subject compound surface level, without need for measuring the height of plural blocks followed by mathematical computation and the use of sine tables, as in the aforesaid patent to Seidel. Rather, in the use of my invention, the exact angles may be determined by formula in order to correctly elevate the sine bar.

The invention provides means to solve for a vertical distance from the surface plate to the compound surface. As this distance is orthogonal to the surface plate, the same can be determined by gauge blocks using a suitable indicator. The observed distance is correctly solvable only when the workpiece is correctly oriented on the sine bar, and the sine bar of my invention facilitates such correct placement.

Further, the sine bar herein is provided with two differing sine distances, namely 3 inches and 5 inches, whereby the bar may be used as either in the setup for single angles.

The subject sine bar in achieving the foregoing is nonetheless easily manufactured with high precision

DESCRIPTION OF THE PREFERRED EMBODIMENT

Figure 1:
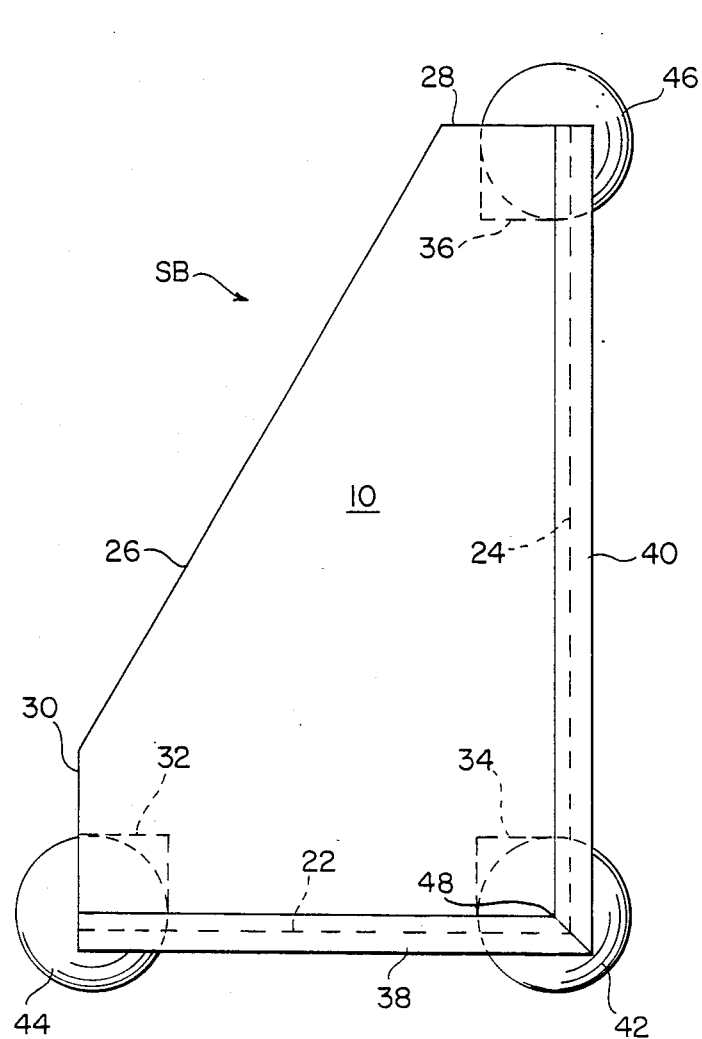
FIG. 1 is a top plan view of the sine bar of the invention.

Referring to the drawings, the sine bar SB of the invention in the disclosed form essentially comprises seven elements, each being finish ground on all surfaces to a high tolerance. Accordingly, the sine bar includes a plate or base surface 10 including right-angularly related short and long sides 22, 24, and an angled side 26 extending between short right-angle side portions 28, 30 respectively parallel to the said short and long sides 22, 24. A base frame 20 (FIG. 4) is disposed under and secured to plate 10, and substantially corresponds to the outside configuration of the plate 10 excepting at the three right-angle corners where the base frame 20 is right-angularly notched at 32, 34, and 36.

Figure 3:
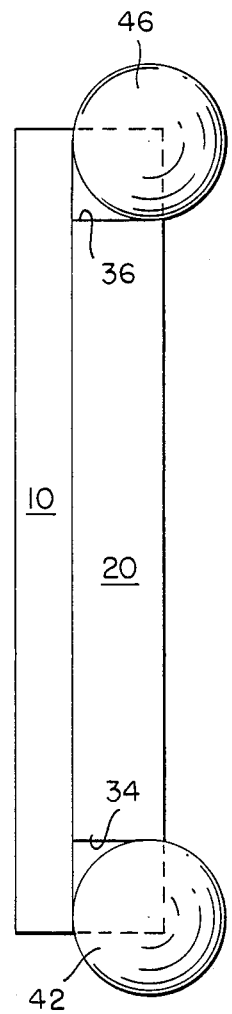
FIG. 3 is a side elevation thereof, with the edge rails removed.
Figure 2:
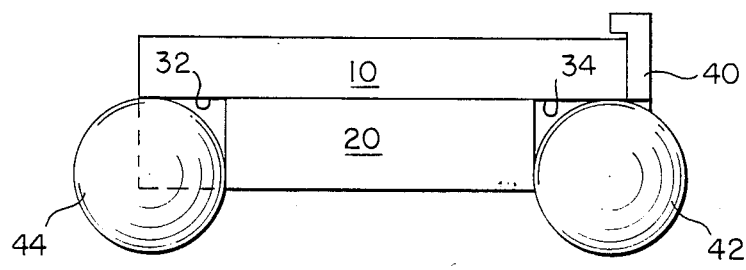
FIG. 2 is a front elevation thereof, with the front edge rail removed.
Figure 4:
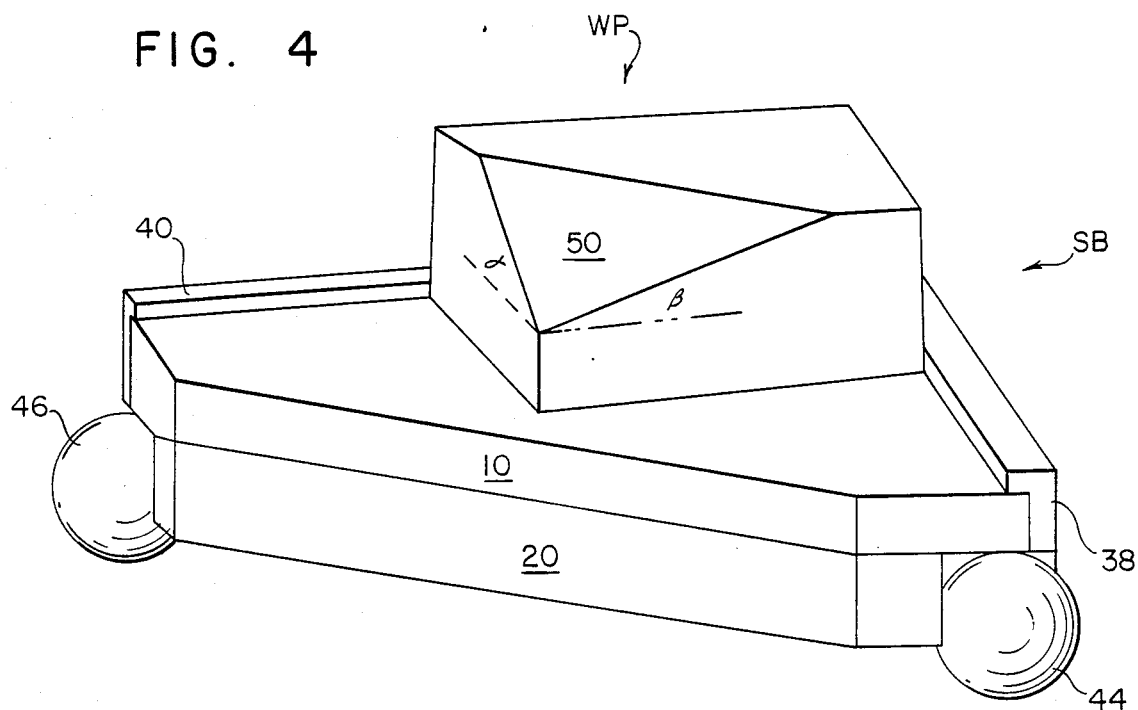
FIG. 4 is a perspective view of the sine bar showing a workpiece thereon having a compound angle placed correctly for inspection.

The principal sides 22, 24 of plate 10 are provided respectively with rails 38, 40 of generally L-shaped cross-section as seen in FIGS. 3 and 4 which are secured, as by screws, to the plate 10. The rail short sides lap over the top plate 10 and extend the full length of the sides 22, 24. At their right angle juncture, the rails may be provided with finished 45° bevels to form a smooth and tight right angle. The rails 38 and 40 are provided with generally arcuate cutouts at each end, whereby space exists for the three like corner spheres 42, 44, and 46, which may be commercially available chrome steel ball bearings (#25 grade or better) of highly precise form. The spheres are fixedly secured to the plate 10 as by angularly disposed screws.

Figure 5:
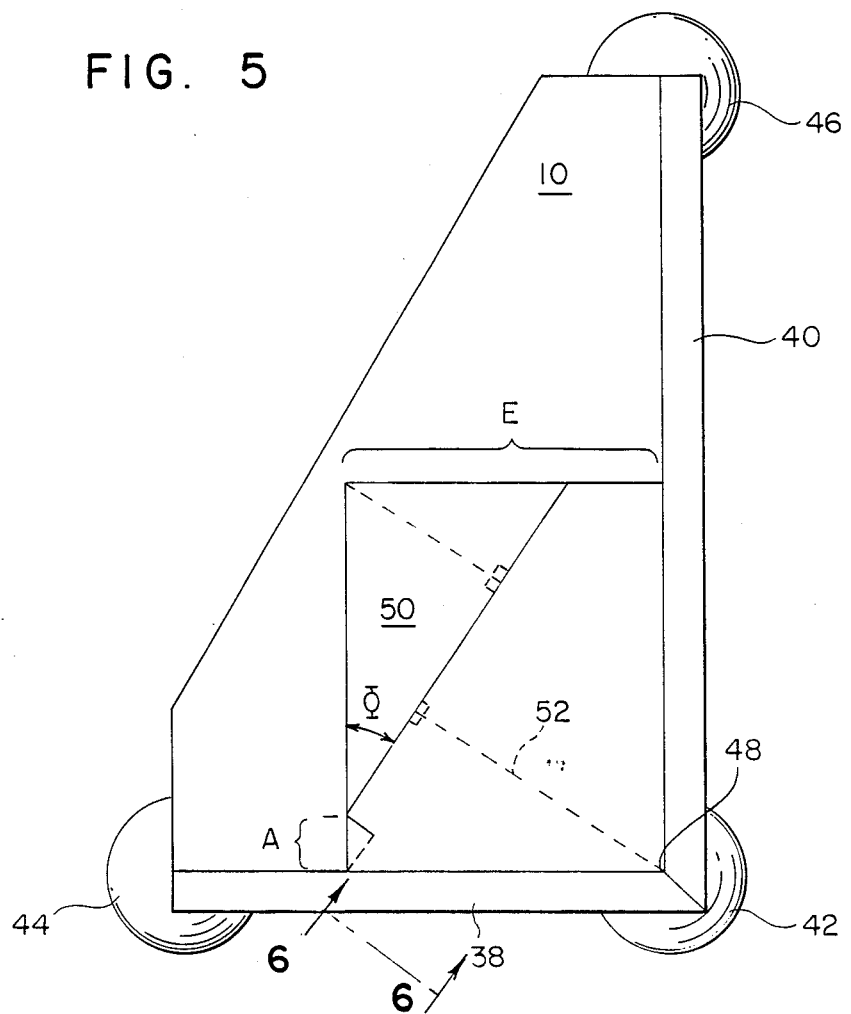
FIG. 5 is similar to FIG. 1 and also showing the workpiece thereon in the position of FIG. 4.

It is important to observe that the spheres are so positioned relative to plate 10 that the corner sphere 42 has its vertical axis at the inside juncture of rails 38 and 40, which point serves to accurately orient a corner of a workpiece WP as seen in FIG. 5 and discussed hereinafter.

Further, the vertical axes of spheres 44 and 46 are precisely positioned to lie center to center with axis 48 along right angle lines at respective distances of 3 inches and five inches. 3" and 5" are shop standards for sine bars, thereby providing a versatile tool in the subject sine bar SB.

The precision location of the spheres 42, 44, 46 along with the side rails 38, 40 permit the sine bar SB of the invention to uniquely and accurately determine compound angles, as on a workpiece WP as seen in FIGS. 4–7.

The illustrative workpiece WP comprises a parallelepiped block, three adjoining faces of which have been cut by an angled surface 50. Thus, as noted, placement of the workpiece WP as seen in FIG. 4–7 with the longer side adjacent rail 40 and the shorter side against rail 38 disposed at the corner of the workpiece WP remote from the cut surface in alignment with axis 48 at the enclosed corner.

The cut surface 50 is defined by the angle α along the short face between the cut edge and a line parallel to the base, and by angle β along the longer face and a like line parallel to the base.

In checking the angle cut, it is necessary to elevate the sine bar so that the compound surface 50 is horizontally level. To do so, it is necessary to elevate by separate angle distances the short and long sides of plate 10.

The angle to which the side 22 (the 3" side) is elevated is the arctangent of the tangent of α multiplied by the cosine of β. The angle to which the 5" side 24 is elevated will be the arctangent of the reverse expression, namely the quantity (tan β·cos α).

Figure 7:
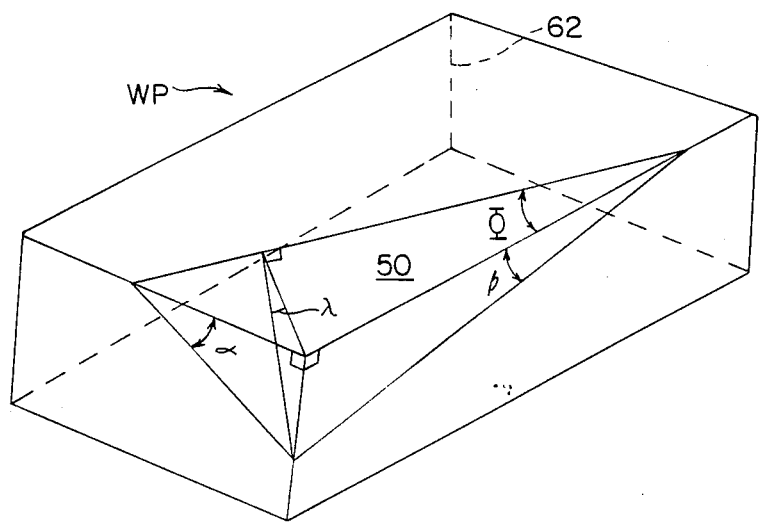

Accordingly, with reference to FIG. 7 and compound trigonometry, the unknown angles Φ and λ are solved from the known angles β and α, thus:

$$\tan \Phi = \frac{\tan \beta}{\tan \alpha} \quad \tan = \frac{\tan \beta}{\sin \Phi}$$

Having determined tan Φ, angle Φ is thus determined, and with reference to FIG. 5, the length of perpendicular 52 extending between the top surface cut edge of workpiece WF and the corner axis 48 can be determined by the formula (E · cos Φ)+(A ·sine Φ), where E=the short width of workpiece WP as seen in FIG. 5, and A=the length of the long side of the workpiece from the edge of the surface 50 at angle φ.

Figure 6:
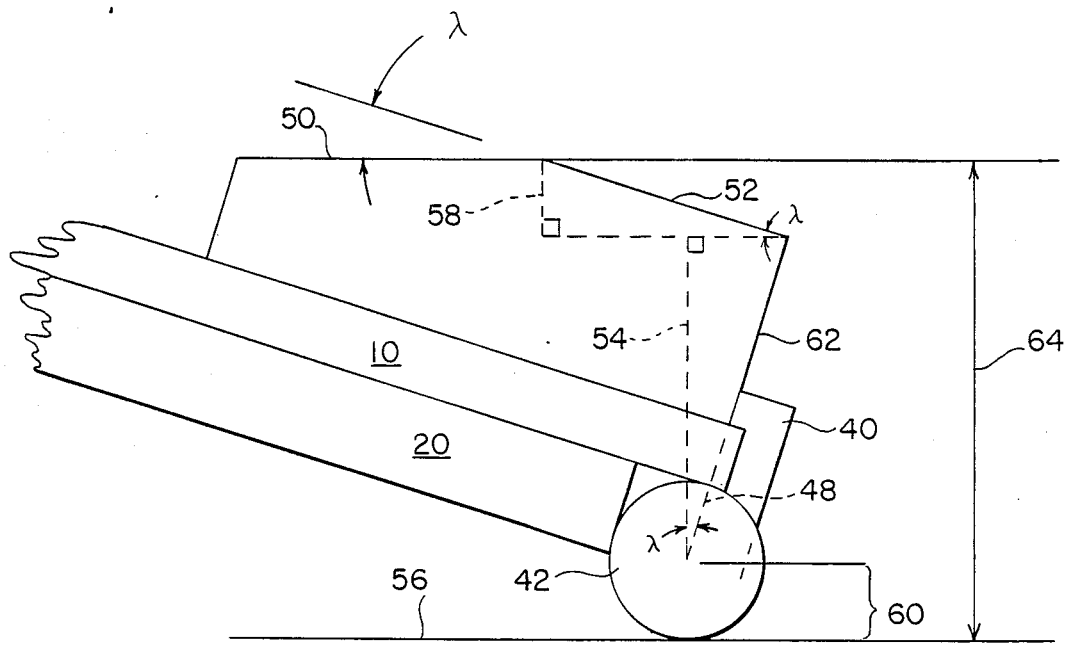
FIG. 6 is a fragmentary side elevation of the sine bar with the illustrative workpiece thereon, and oriented for measurement, taken generally on an angle to the view of FIG. 5; and, FIG. 7 is a perspective view of an illustrative workpiece having the compound angle surface thereon to be inspected.

Further, referring to FIG. 6, the sine bar is elevated by pivoting upwardly on corner sphere 42 to the angle λ, which is accomplished by simultaneously elevating the three-inch and the five-inch sine distances to their respective angles. As a result also, the like angle between the top of workpiece WP and the horizontal is also angle λ. In like manner, with the sine plate tilted as shown, the new vertical axis 54 (FIG. 6) through sphere 42 forms the angle λ with the former vertical axis 48, all as referenced to a horizontal surface as at 56.

Accordingly, by trigonometry, the distance 58 is equal to the distance 52 multiplied by the sine of λ. In addition, the distance 54 is equal to a quantity represented by (1) the full height of workpiece WP plus (2) the thickness of plate 10 plus (3) the radius of sphere 42, all multiplied by the cosine of angle λ. Further, it is apparent that the vertical distance from the horizontal surface 56 to the compound surface 50, namely distance 64, is equal to the distances (60+54+58), and distance 64 is the perfected reference with which to compare the compound surface 50.

In the light of the discussion, it will be seen that the plate 10 must be flat with a right-angled corner, other dimensions being non-critical, while the base frame 20 needs to have a thickness at least as great as the radius of the spheres so as to provide an adequate tangent surface, and the frame must orient spheres 42, 44, and 46 precisely as set forth.

In this manner, the unique sine bar structure of the invention permits the quick and ready determination of compound angles of workpieces in a manner superior to those earlier provided.

While I have disclosed and described a preferred form of my invention, it is evident that the principles and operative structure thereof may be utilized in other sine bar devices of varying appearance without departing from the spirit and scope of the invention as defined in the appended claims.

What I claim is:

1. A compound angle sine bar comprising a base frame,
   said base frame being affixed to a flat upper plate which is precision ground to be flat,
   said base frame defining means for precisely locating three corner precision ground spheres with respect thereto wherein lines extending between their respective centers define a right triangle, and,
   wherein said upper plate, said frame, and a flat surface upon which said sine bar is placed each have surfaces tangent to each said sphere.

2. The sine bar of claim 1 wherein the center to center distance of the right-angle corner sphere and a second said sphere is three inches, and the center to center distance of the right-angle corner sphere and a third said sphere is five inches.

3. A compound angle sine bar comprising a base frame,
   said base frame being affixed to a flat upper plate which is precision ground to be flat,
   said base frame defining means for precisely locating three corner precision ground spheres with respect thereto wherein lines extending between their respective centers define a right triangle, wherein said rails are provided along said plate on the two sides thereof defining the right angle of said right triangle, and,
   wherein the inside surfaces of said rails intersect at said right triangle so as form a right angle in axial alignment with the center of said corner sphere, thereby to facilitate precise positioning of a right-angled workpiece to dispose a right angle corner thereof at an axis extending from said corner sphere center perpendicular to said right angle.

4. A compound angle sine bar comprising a base frame,
   said base frame being affixed to an upper plate which is precision ground to have a flat upper surface,
   said base frame defining means for precisely locating three corner precision ground spheres with respect thereto wherein lines extending between their respective centers define a right triangle, said upper plate, said frame, and a flat surface upon which said sine bar is placed each have surfaces tangent to each said sphere, and, side rails mounted along said plate on two sides thereof in positions with respect to said lines defining said right triangle so that inside surfaces of said rails lie along the right angle legs thereof.

5. The sine bar of claim 4 wherein the center to center distance of the right-angle corner sphere and a second said sphere is three inches, and the center to center distance of the right-angle corner sphere and a third said sphere is five inches.

6. The sine bar of claim 4 wherein the inside surfaces of said rails intersect at said right triangle so as form a right angle in axial alignment with the center of said corner sphere, thereby to facilitate precise positioning of a right-angled workpiece to dispose a right angle corner thereof at an axis extending from said corner sphere center perpendicular to said lines defining said right angle.

7. A compound angle sine bar comprising a base frame, a flat upper plate precision ground to be flat on its upper surface, said plate being affixed upon said base frame, three precision ground spheres, said base frame defining means for precisely locating said three precision ground spheres in corners of said frame with respect thereto wherein lines extending between the respective centers of said spheres define a right triangle, means securing said spheres in position side rails mounted along said plate on the two sides thereof defining the right angle sphere-to-sphere lines of said right triangle, said side rails having planar inside faces coincident with planes extending upwardly from said right angle sphere-to-sphere lines, whereby the inside faces of said rails define legs of said right triangle in axial alignment with the center of said corner space, thereby to facilitate precise positioning of a right-angled workpiece to dispose a right angle corner thereof at an axis extending through said corner sphere center.

8. The sine bar of claim 7 wherein the center-to-center distance of the right-angle corner sphere and a second said sphere is 3", and the center-to-center distance of the right-angle corner sphere and a third said sphere is 5".

9. The sine bar of claim 7 wherein said upper plate, said frame, and a flat surface upon which said sine bar is placed each have surfaces tangent to each said sphere.

* * * * *